INVENTOR.
RICHARD KEITH HOSKIN
BY
Lyon & Lyon
ATTORNEYS

May 26, 1970   R. K. HOSKIN   3,514,191
LIGHT VALVE WITH AUTOMATIC CLOSURE CONTROL
Filed Nov. 10, 1966   2 Sheets-Sheet 2

INVENTOR.
RICHARD KEITH HOSKIN
BY Lyon & Lyon
ATTORNEYS

United States Patent Office 3,514,191
Patented May 26, 1970

3,514,191
LIGHT VALVE WITH AUTOMATIC
CLOSURE CONTROL
Richard Keith Hoskin, Gardena, Calif., assignor to
Thompson Optical Engineering Co., Los Angeles,
Calif., a corporation of California
Filed Nov. 10, 1966, Ser. No. 593,546
Int. Cl. G02f 1/30; H01h 47/32, 47/00
U.S. Cl. 350—269                                    13 Claims

ABSTRACT OF THE DISCLOSURE

A light valve in which the movement of a pair of relatively movable blades are electromagnetically controlled, the blades being positively driven to block a light path after a predetermined amount of light has been transmitted through it.

This invention relates to a light valve and more particularly relates to a light valve for use in a camera or the like.

In present day photographic equipment, and particularly in high speed cameras, it is desirable that the exposure time of the film be accurately controlled in accordance with the brightness of the scene and consequently, the amount of light falling on the film. While this can be accomplished by means of a light meter and a manual diaphragm aperture setting mechanism, it has become common practice to provide a system for automatically sensing the light available and then electrically adjusting the diaphragm opening in response to the sensed light level. The majority of these systems, however, do not sense the amount of light actually reaching the film; rather, they sense the amount of light reaching a sensor which is positioned on the camera adjacent the lens and thus receives a somewhat different illumination value than that seen by the lens. Moreover, such systems generally require both a shutter which operates independently of the sensor, and an iris diaphragm the opening of which is controlled by the sensor and thus are both complicated and expensive.

It is an object of the present invention to provide a light valve for a camera or the like in which the exposure time of the film is controlled by the amount of light actually reaching the film.

It is also an object of the present invention to provide such a light valve in which a pair of relatively movable blades take the place of both the shutter and the diaphragm of a conventional light valve.

It is another object of the present invention to provide such a light valve in which the blades are caused to be positively opened and closed.

It is a further object of the present invention to provide such a light valve in which an electrical circuit controlled by the light reaching the film determines the length of time and area that the blades are open.

These and other objects and advantages of the present invention will become more apparent upon reference to the accompanying description and drawings in which.

Briefly, the present invention provides apparatus in which a pair of relatively movable blades are positioned in the optical path of the light being transmitted to the film in a camera or any other suitable target. Between these blades and the film there is positioned a photosensitive device which produces an electrical output corresponding to the light actually being transmitted to the film. The blades are magnetically operated with coils being provided for both positively opening and positively closing them. The blade opening coil is energized upon actuation of the picture taking mechanism and the blade closing coil is energized, and the opening coil deenergized, in accordance with the output of the photosensitive device.

Figure 1:
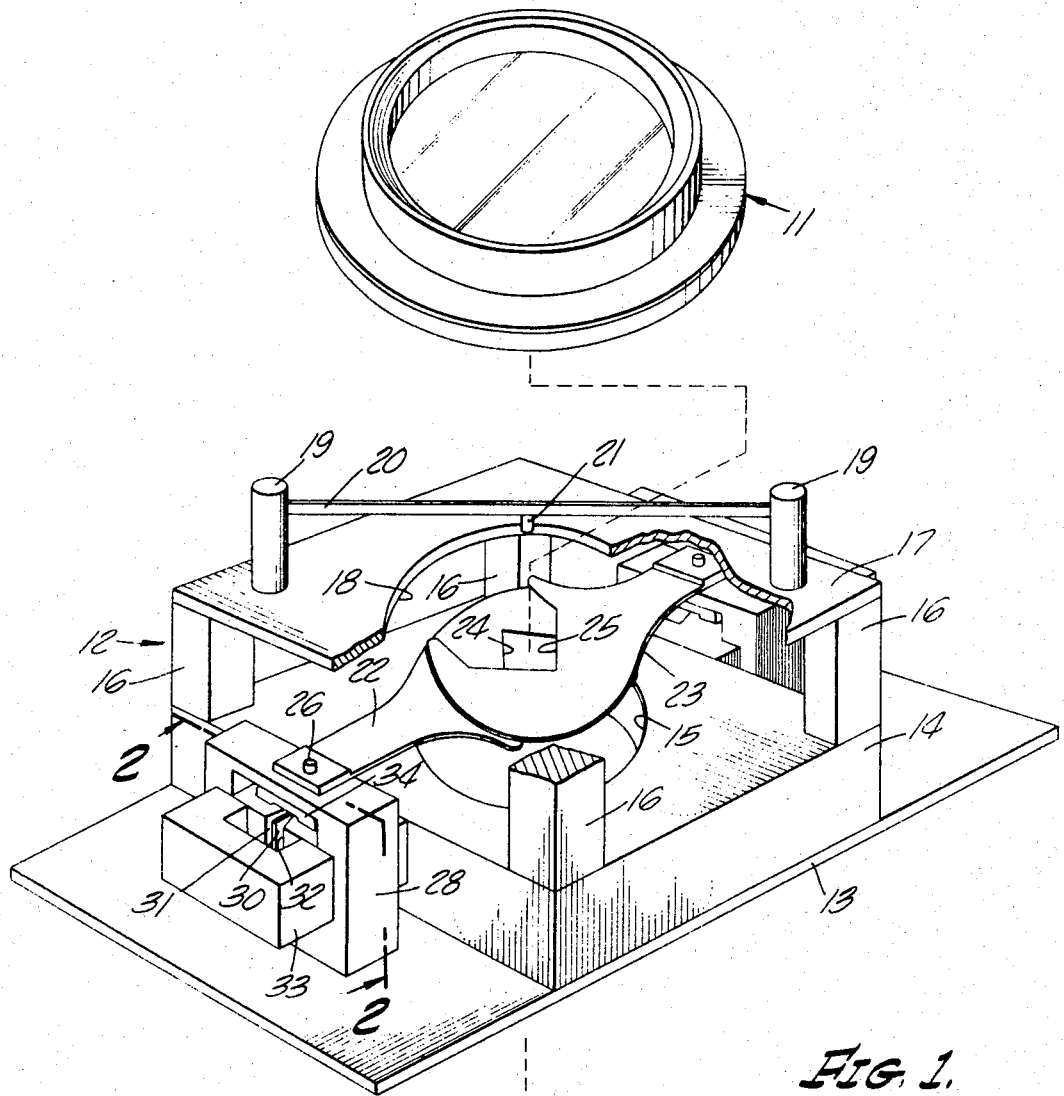
FIG. 1 is a partially exploded perspective view of the light valve of the present invention.
Figures 2, 3:
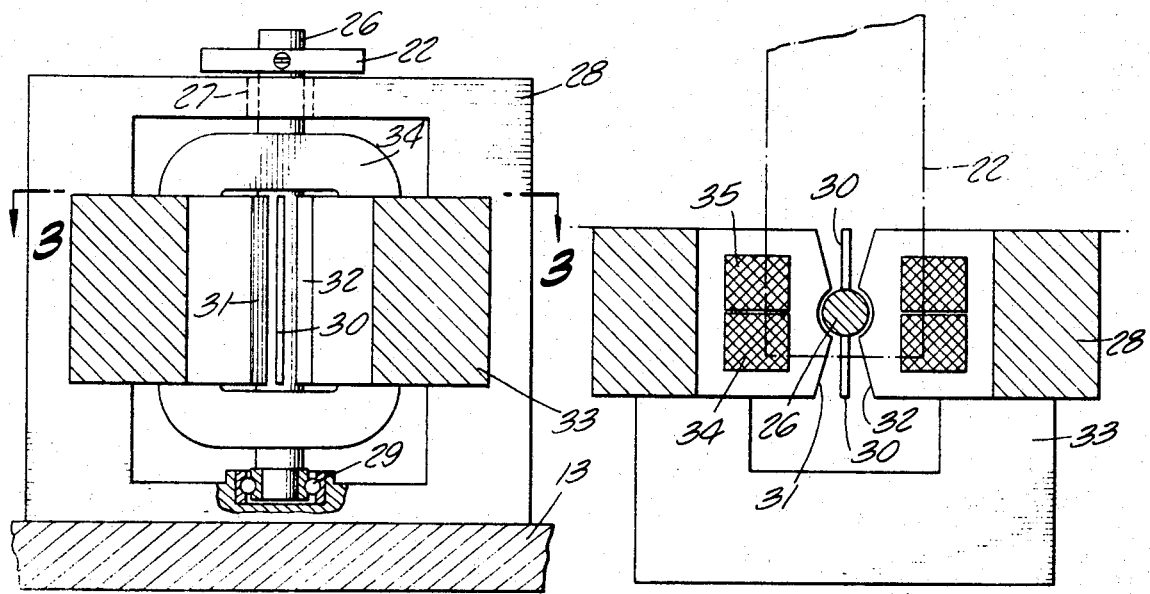
FIG. 2 is a cross-sectional view taken along lines 2—2 of FIG. 1.
FIG. 3 is a sectional view taken along lines 3—3 of FIG. 2.

Turning now to FIGS. 1, 2 and 3, the mechanical details of the apparatus of the present invention is illustrated. It should be understood that the illustration is somewhat schematic and the structural features of the camera itself are not shown. However, such structural features form no part of the present invention. It should also be understood that the light valve of the present invention is useful in applications other than in cameras and therefore the present description is intended to be illustrative only and not restrictive. As shown, between a front lens 10 and a rear lens 11, there is positioned the light valve of the present invention, generally indicated at 12. The light valve 12 consists of a plate 13 upon which is mounted a block 14, the plate 13 and block 14 being provided with an aperture 15 into which fits the lens 10. The block 14 has a plurality of legs 16 which support a plate 17 which has an aperture 18 aligned with the aperture 15 and which receives the lens 11 so that the optical axis of the lenses 10 and 11 are in alignment.

A pair of posts 19 extending beyond the lens 11 are mounted on the plate 17 and have a taut band 20 suspended between them. A photosensitive device 21 is mounted on the band 20 and receives the light passed through the lenses 10 and 11. The film plane or other target is positioned in the optical path behind the device 21. The amount of light that passes from the lens 10 to the lens 11 is determined by the position of a pair of shutter blades 22 and 23 which preferably are formed with notches 24 and 25 respectively so that when the blades 22 and 23 move away from each other, a diamond-shaped aperture is formed.

The blade 22 is fixedly mounted on a shaft 26 which is journalled in a bearing 27 positioned in a bore formed in a mounting bracket 28 and which is provided with a lower end journaled for rotation in a bearing 29. Fixedly mounted on the shaft 26 are vertical fins 30 constructed of magnetic material. The shaft 26 and fins 30 extend between the pole faces 31 and 32 of a yoke 33 of magnetic material which is partly positioned within the bracket 28. A pair of coils 34 and 35 are wound through the yoke 33 and serve when energized to generate magnetic flux in the yoke so that when the coil 34 is energized the fins 30 will be driven toward and held against the pole face 31 while when the coil 35 is energized, the fins 30 will be driven toward and held against the pole face 32. The coils, of course, are provided with suitable openings to permit passage therethrough of the shaft 26.

The blade 23 is provided with a driving mechanism in all respects identical to that driving the blade 22. The coils causing movement of the blade 23 may electrically be part of the same coils causing movement of the blade 22. Because of the remanent magnetism of the yoke 33 the fins 30 are normally maintained against the pole face 31 thereby holding the blade 22 in the closed position. The same is true of the blade 23 so that no light is transmitted to the lens 11. The blades 22 and 23 preferably are made of very light-weight material so that their inertia is low and they consequently can be moved very rapidly from the closed position to the open position and vice versa by operation of the electrical circuit of FIG. 4.

Figure 4:
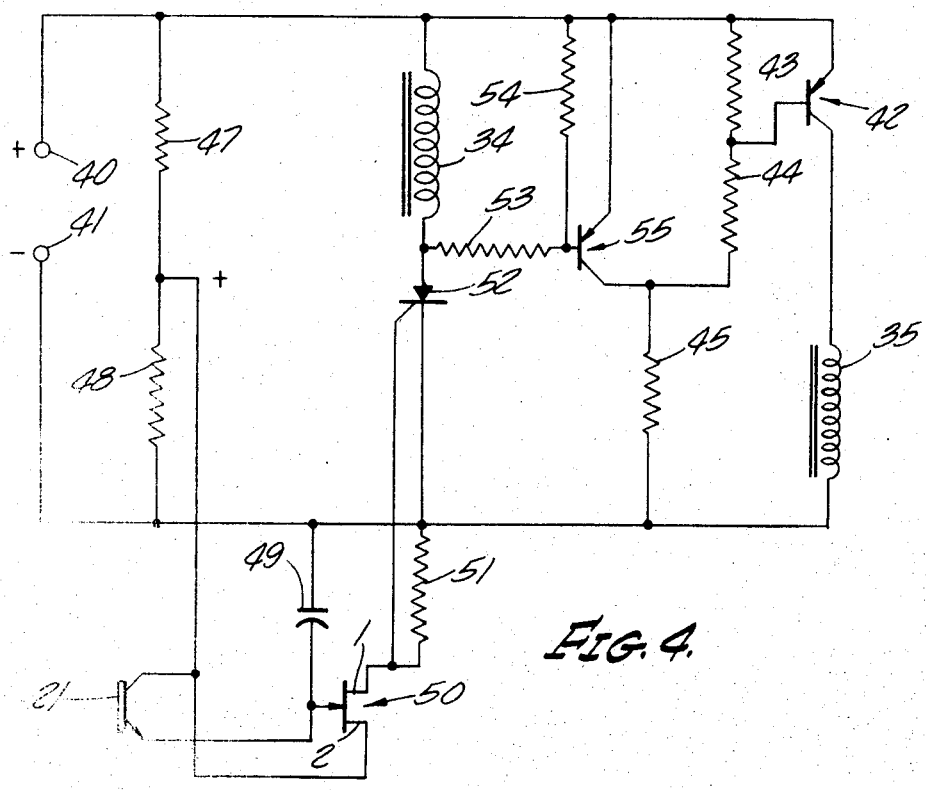
FIG. 4 is a schematic diagram of the electrical circuitry of the present invention.

Turning now to FIG. 4, the electrical circuit for controlling the operation of the blades 22 and 23 is illustrated. A pair of input terminals 40 and 41 received an operating pulse generated in the conventional manner when the camera mechanism is operated. The input terminal 40 is connected to the emitter of a PNP transistor 42 whose collector is connected to one side of the "open" coil 35, the other end of which is connected to the input terminal 41. The transistor 42 is biased into conduction by a voltage divider consisting of the resistors 43, 44 and 45, the base of transistor 42 being connected to the junction of the resistors 43 and 44. The collector of a photosensitive transistor 21 is connected to the junction of a pair of resistors 47 and 48 connected across the input terminals 40 and 41. The emitter of the photosensitive transistor is connected through a capacitor 49 to the terminal 41.

The positive side of capacitor 49 is also connected to the emitter of a unijunction transistor 50 whose base 2 is connected to the junction of resistors 47 and 48 and whose base 1 is connected through a resistor 51 to the input terminal 41. The base 1 of the transistor 50 is also connected to the gate electrode of a silicon controlled rectifier 52 whose cathode is connected to the input terminal 41 and whose anode is connected through the "close" coil 34 to the input terminal 40. The junction of the coil 44 and the anode of the SCR 52 is connected to the input terminal 40 by resistors 53 and 54, the junction of which is connected to the base of a PNP transistor 55. The emitter of transistor 55 is connected to the input terminal 40 while its collector is connected to the junction of the resistors 44 and 45.

The operation of the circuit of FIG. 4 is as follows. When an input pulse is applied to the input terminals 40 and 41, the transistor 42 is rendered conducting with the result that a current passes through the "open" coil 35 causing the blades 22 and 23 to move away from each other. This permits light to pass through the lenses 10 and 11 and fall upon the photo-sensitive transistor 21. This light renders the transistor 21 conducting, the amount of conduction depending upon the amount of light falling upon it, with the result that the capacitor 49 begins to charge at a speed determined by the conduction of transistor 21. When the voltage across the capacitor 49 reaches a predetermined critical value, the transistor 50 is rendered conducting with the result that the voltage at the base 1 of this transistor rises sharply. This rising voltage pulse turns on the SCR 52 and it begins to conduct and pass current through the "close" coil 34. With higher light levels the close coil will be energized while the blades are partially open. The exposed area is thus inversely proportional to the light level. This proportional opening of the blades permits the iris to be eliminated and allows high shutter speed at high light intensity.

When the SCR 52 begins to conduct, current flows through the resistors 54 and 53, the voltage at the base of the transistor 55 decreases, and this transistor begins to conduct. Conduction of this transistor results in the voltage at the junction of the resistors 44 and 45 rising to approximately the potential of the input terminal 40, that is, the potential at the top of the resistor 43. As a result, there is no potential drop across the resistors 43 and 44 and the transistor 42 is cut off. Current thus ceases to flow through the coil 35.

The decreasing current in the coil 35 and the increasing current in the coil 34 causes the magnetic flux in the fins 30 to change direction with the result that the fins 30 are caused to move smoothly from against the pole face 32 to against the pole face 31 moving the blade 22 to the closed position. The same thing occurs with respect to the blade 23 with the result that the optical path is blocked and no more light reaches the transistor 21 or the film. As soon as the input pulse terminates, the current through the coil 34 is terminated and the SCR 52 turns off. The remanent magnetism in the yoke 33 holds the fins 30 against the pole face 31 so that the optical path remains closed. This system is now ready for another operating pulse. Because of the low inertia of the blades and the rapid response time of the circuit, the operating pulses can be spaced very close together.

In the apparatus illustrated and described, the photosensitive device 21 is positioned directly in the optical path of the light traveling to the film. If desired, the system can be rearranged to respond to the amount of light reflected by the film, this amount, of course, being a function of the amount of light reaching the film. To accomplish this, the photosensitive device 21 is removed from the optical path and mounted in a position where it will receive the reflected light, for example, the device may be positioned next to the lens 11 with its photosensitive surface pointed toward the film. If desired, more than one photosensitive device can be used in this manner as will be obvious to those skilled in the art.

From the foregoing description it can be seen that apparatus has been provided that controls the exposure time of a photographic emulsion or the like in response to the amount of light actually reaching the emulsion. The apparatus utlizes a pair of low inertia shutter blades for opening and closing the optical path to the film and thus eliminates the need for a separate shutter and iris diaphragm. Since the blades are magnetically moved to both the open and closed position and then held firmly in place by magnetic attraction, there is no bouncing of the blades with the result that their operation is more accurate and reliable and the wear on the moving parts is reduced.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A light valve for controlling the light transmitted through an optical path from a source to a target comprising:

first and second blades;

means mounting said first blade for movement into and out of said optical path;

means mounting said second blade for movement into and out of said optical path opposite to said first blade whereby said optical path may be blocked by said blades;

first coil means energizable to move said blades into said optical path;

second coil means energizable to move said blades out of said optical path;

sensor means positioned behind said blades for receiving light passed through said blades and producing an electrical output in response thereto;

means for energizing said second coil means; and means coupled to said sensor means and to said first coil means and responsive to the output of said sensor means for energizing said first coil means and de-energizing said second coil means.

2. The light valve of claim 1 wherein each of said means for mounting said blades comprises a shaft rotatably mounted in bracket means positioned on opposite sides of said optical path.

3. The light valve of claim 2 wherein fin means of magnetic material are mounted on said shaft and extend along a portion of the length thereof.

4. The light valve of claim 3 wherein a yoke of magnetic material is positioned around said fin means, said yoke having first and second faces facing said fin means, said first and second coil means being magnetically coupled with said yoke whereby energization of one of said coil means causes said fin means to be attracted to a respective one of said faces.

5. The light valve of claim 1 wherein the output of said sensor means increases with increasing light received thereby and wherein said responsive means comprises means responsive to the magnitude of said output to energize said first coil means and de-energize said second coil means after a predetermined amount of light is received by said sensor means.

6. The light valve of claim 1 wherein said means for energizing said second coil means comprises a pulse source; said sensor means comprises a photo-sensitive transistor; and said means responsive to the output of said sensor means comprises a capacitor connected to said transistor and charged by current therethrough and means responsive to the voltage across said capacitor for energizing said first coil means and de-energizing said second coil means.

7. The light valve of claim 6 wherein said means responsive to the capacitor voltage comprises a second transistor connected to said capacitor and rendered conductive when the voltage across said capacitor reaches a predetermined level, and a controlled rectifier connected to said second transistor and rendered conductive upon conduction of said second transistor, said controlled rectifier being connected in series with said first coil means.

8. The light valve of claim 7 wherein said second coil means is connected to said pulse source by a third transistor biased to conduct when a pulse is received from said source, and wherein a fourth transistor is provided, said fourth transistor being coupled to said controlled rectifier, and to said third transistor, said fourth transistor being rendered conductive by conduction of said controlled rectifier, conduction of said fourth transistor causing said third transistor to be biased into nonconduction.

9. A light valve for controlling the light transmitted through an optical path from a source to a load comprising.
   first and second blades;
   a first shaft rotatably mounted in a bracket means positioned on one side of said optical path, said first blade being mounted on said first shaft whereby said first blade can be moved into and out of said optical path;
   a second shaft rotatably mounted in a bracket means positioned on the opposite side of said optical path, said second blade being mounted on said second shaft whereby said second blade can be moved into and out of said optical path in a direction opposite to said first blade whereby said optical path may be blocked by said blades;
   first and second means operable to move said first and second blades respectively into or out of said optical path, each of said means comprising a pair of fins of magnetic material mounted on the respective shaft and extending along a portion of the length thereof; a yoke of magnetic material positioned around said fins, said yoke having first and second faces facing said fins; and first and second coil means magnetically coupled with said yoke whereby energization of said first coil means causes said fins to be attracted to said first face and the associated blade moved into said optical path, and energization of said second coil means causes said fins to be attracted to said second face and the associated blade moves out of said optical path;
   sensor means positioned behind said blades for receiving light passed through said blades and producing an electrical output in response thereto;
   means for energizing said second coil means; and
   means coupled to said sensor means and to said first coil means and responsive to the output of said sensor means for energizing said first coil means and de-energizing said second coil means.

10. The light valve of claim 9 wherein the output of said sensor means increases with increasing light received thereby and wherein said responsive means comprises means responsive to the magnitude of said output to energize said first coil means and de-energize said second coil means after a predetermined amount of light is received by said sensor means.

11. The light valve of claim 9 wherein said means for energizing said second coil means comprises a pulse source; said sensor means comprises a photo-sensitive transistor; and said means responsive to the output of said sensor means comprises a capacitor connected to said transistor and charged by current therethrough and means responsive to the voltage across said capacitor for energizing said first coil means and de-energizing said second coil means.

12. The light valve of claim 11 wherein said means responsive to the capacitor voltage comprises a second transistor connected to said capacitor and rendered conductive when the voltage across said capacitor reaches a predetermined level, and a controlled rectifier connected to said second transistor and rendered conductive upon conduction of said second transistor, said controlled rectifier being connected in series with said first coil means.

13. The light valve of claim 12 wherein said second coil means is connected to said pulse source by a third transistor biased to conduct when a pulse is received from said source, and wherein a fourth transistor is provided, said fourth transistor being coupled to said controlled rectifier and to said third transistor, said fourth transistor being rendered conductive by conduction of said controlled rectifier, conduction of said fourth transistor causing said third transistor to be biased into non-conduction.

References Cited
UNITED STATES PATENTS

| | | | |
|---|---|---|---|
| 3,082,674 | 3/1963 | Bagby | 95—64 |
| 3,166,635 | 1/1965 | Todt | 178—7.3 |
| 3,275,399 | 9/1966 | Johnson | 352—141 |
| 3,299,789 | 1/1967 | Chandler et al. | 95—64 |

RONALD L. WIBERT, Primary Examiner

P. K. GODWIN, Jr., Assistant Examiner

U.S. Cl. X.R.

95—62; 317—124, 148.5, 155.5; 335—183; 337—1; 350—272